United States Patent

[11] 3,592,293

| [72] | Inventor | Frederick H. Frincke |
| | | Royal Oak, Mich. |
| [21] | Appl. No. | 2,081 |
| [22] | Filed | Jan. 12, 1970 |
| [45] | Patented | July 13, 1971 |
| [73] | Assignee | General Motors Corporation |
| | | Detroit, Mich. |

[54] OIL PUMP WITH PRESSURE LUBRICATED SWIVELLING AUTO INLET MEANS
6 Claims, 4 Drawing Figs.

[52] U.S. Cl............................................ 184/6 B,
123/196, 137/579
[51] Int. Cl...................................................... F01m 11/06
[50] Field of Search........................................... 137/579 XR,
615; 184/6 B, 103 A, 6; 123/196, 196 CP

[56] References Cited
UNITED STATES PATENTS

| 1,613,703 | 1/1927 | Harris | 137/579 |
| 1,921,670 | 8/1933 | Gulick | 184/103 A (X) |
| 1,989,816 | 2/1935 | Meyer | 184/6 B |
| 3,031,011 | 4/1962 | Dawson et al. | 137/579 |
| 3,106,263 | 10/1963 | McKellar | 184/6 B (X) |
| 3,266,519 | 8/1966 | Kintzel et al. | 137/579 |
| 3,416,633 | 12/1968 | Swearingen | 123/196 (X) |

Primary Examiner—Manuel A. Antonakas
Attorneys—Jean L. Carpenter and Arthur N. Krein ABSTRACT: An engine oil pump system including a swivel-mounted oil pickup tube adapted to move with the movement of oil in the engine oil pan under severe operating conditions in which the swivel joint of the oil pickup tube is pressure lubricated with oil from the oil pump to improve swivel action and to prevent the intake of air through the swivel joint into the oil pump inlet.

PATENTED JUL 13 1971
3,592,293
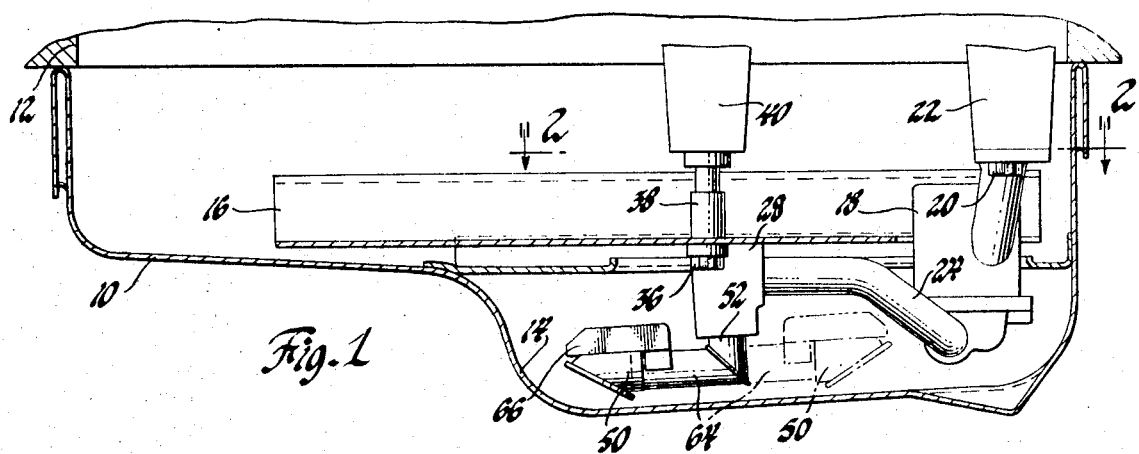
Fig. 1
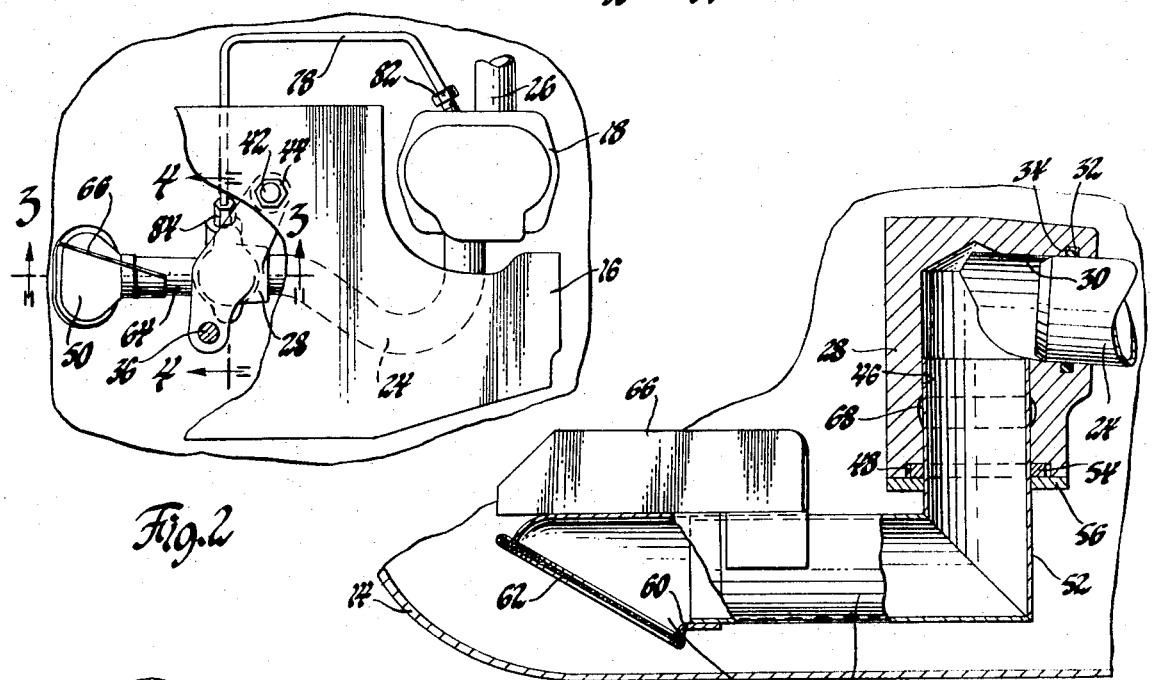
Fig. 2
Fig. 3
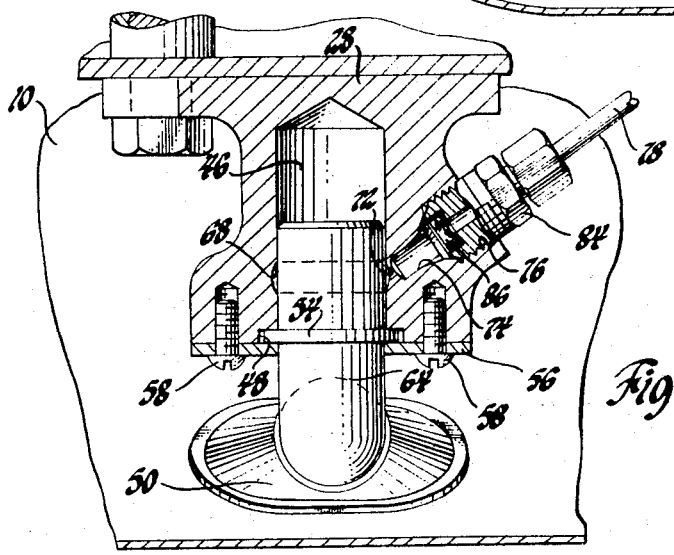
Fig. 4
INVENTOR.
Frederick H. Frincke
BY
Arthur N. Krein
ATTORNEY

OIL PUMP WITH PRESSURE LUBRICATED SWIVELLING AUTO INLET MEANS

This invention relates to an engine oil pump arrangement having a swinging oil pickup tube and, more specifically, to an engine oil pump with an oil pressure lubricated swinging oil pickup tube.

It has long been a problem in the engine of motor vehicles to maintain a satisfactory oil level within the oil pan of the engine under all vehicle operating conditions. When the vehicle is stationary, the oil seeks the lowest level within the oil pan which is normally the oil sump portion of it, the oil pump intake usually being located in the sump portion. When the vehicle is being driven upgrade, the oil tends to shift to the rear of the oil pan, whereas when the vehicle is being driven downgrade, the oil tends to shift to the front of the oil pan. Under certain conditions, this movement of the oil within the oil pan is sufficient to uncover the pump intake in the sump portion to permit air to enter into the oil pump in lieu of oil. Similar conditions are also obtained during sudden acceleration and deceleration and during high speed vehicle maneuvering.

In order to overcome the above-described problem, an engine oil pump arrangement has been used for certain applications which utilizes a swinging oil pickup tube or slinger, hereinafter referred to as a pickup tube, that is free to rotate about a vertical pivot whereby the oil pickup tube is free to move with the movement of oil within the oil pan. In this prior arrangement, the swinging oil pickup tube occasionally became stuck on dead center with the result that it would be at the opposite end of the oil pan from the oil supply therein. In an attempt to correct this problem, weights and the use of a vane added to the oil inlet have given some improvement in reliability to assure swinging movement of the swinging oil pickup tube. However, it has been found that even with these improvements, the pickup tube will not always follow the movement of the oil due to the fact that it will bind at the rotatable joint. In addition, another problem encountered has been the entry of air into the oil inlet at this rotative junction.

Thus, the two basic problems encountered in the use of a swivel-type pickup tube are that when it is fitted too tightly in its swivel joint, it tends to freeze and thus prevent it from moving to follow the supply of oil and, on the other hand, if the swivel joint of the pickup tube is fitted too loosely to permit it to rotate freely, this loose fit will then allow air to be drawn into the oil pickup tube at the swivel joint.

Accordingly, the primary object of this invention is to improve an engine oil pump system for an internal combustion engine whereby the inlet to the oil pump is mounted for swinging movement to move with the supply of oil in an oil pan, to provide adequate and continuous engine oil lubrication under all operating conditions.

Another object of this invention is to improve an engine oil pump arrangement whereby an oil inlet is mounted by a swivel joint for rotative movement within the oil pan of an engine and whereby the swivel joint is effectively sealed to prevent the entry of air through the swivel joint into the inlet of the engine oil pump.

These and other objects of the invention are obtained by means of an engine oil pump mounted in or adjacent to the engine oil pan and having an inlet chamber and an outlet chamber, the inlet chamber being connected by a conduit to a pivot support member which pivotally mounts an oil pickup tube adapted to pivot so as to move with the movement of oil in the oil pan, the outlet chamber of the oil pump being connected by a secondary outlet conduit to deliver oil to the support member to lubricate the oil pickup tube as it pivots therein, and to form an oil seal around the pivotal connection of the oil pickup tube to prevent the ingress of air therein.

For a better understanding of the invention, as well as other objects and further features thereof, reference is had to the following detailed description of the invention to be read in connection with the accompanying drawings, wherein:

FIG. 1 is a side view of a portion of an internal combustion engine having an oil pan and an engine oil pump system in accordance with the invention mounted therein;

FIG. 2 is a view taken along line 2-2 of FIG. 1;

FIG. 3 is an enlarged view taken along line 3-3 of FIG. 2; and,

FIG. 4 is an enlarged view taken along view 4-4 of FIG. 2.

Referring now to FIG. 1, there is shown an oil pan 10 suitably secured to the cylinder block 12 of an internal combustion engine to enclose the underside of the cylinder block. The oil pan 10 is provided with a depressed bottom portion to form an oil sump 14 for a quantity of oil therein and a baffle plate 16 secured therein above the sump 14. An engine oil pump 18 is positioned within the oil pan and is secured by bolts 20 to a depending crank case arm 22. The oil pump 18, which may be a conventional gear-type pump, has an inlet chamber fed by an inlet conduit 24 and an outlet chamber connected to a discharge conduit 26 for delivering oil to lubricate various parts of the engine. The opposite end of inlet conduit 24 is connected to the discharge passage 30 in support member 28 and sealed therein as by an O-ring 32 mounted in an annular groove 34 of the support member in position to engage the outer periphery of the inlet conduit 24, as seen in FIG. 3.

The support member 28 is secured as by bolt 36 to a stud bracket 38 which in turn is secured to a crank case bearing cap 40 of the engine and by screw 42 engaged in nut 44 welded to the upper surface of baffle 16, with the support member 28 positioned in the sump 14 beneath the baffle plate 16, the bolt 36 and screw 42 extending through suitable apertures in the baffle plate 16. As shown in FIG. 3, the support member is provided with a horizontal discharge passage 30 in communication with a vertical bored passage 46. Swingably and rotatably mounted within the bored passage 46 of the support member 28 is an oil pickup tube, generally designated 50. As shown in FIGS. 3 and 4, the vertical tubular leg 52 of oil pickup tube 50 is rotatively received within the bored passage 46 and is supported therein by a collar 54 encircling the tubular leg and welded thereto, the collar 54 being supported in a counterbored portion 48 of the support member and supported therein by a retainer bearing plate 56 secured to the underside of the support member by screws 58. An oil pickup 60 provided with a screen 62 at the inlet thereof is secured to the free end of the substantially horizontal leg 64 of the oil pickup tube 50. In addition, a vertically extending vane 66 is secured, as by welding, to the upper portion of the horizontal leg 64, in terms of the figures, of the oil pickup tube 50 in position to extend out over the pickup 60 at an angle to the centerline of this horizontal leg 64 whereby the movement of oil within the sump will push against the vane 66 to assist in moving and guiding the oil pickup tube to follow the movement of the oil within the sump to the location of the deepest oil supply as effected by movement of oil within the sump.

To effectively seal and lubricate the swivel joint, an annular oil groove 68 is provided in the support member 28 concentric with the bored passage 46 therein and in position to encircle the vertical leg 52 of the pickup tube 50 when in the assembled position, as shown in FIGS. 3 and 4. Annular oil passage 68 is in communication via a restricted passage 72 as shown in FIG. 4, with an oil passage 74 and internally threaded aperture 76 in the support member 28. A secondary oil discharge conduit 78 is secured at one end to the discharge chamber of the oil pump by conduit fitting 82 and is connected at its opposite end by a conduit fitting 84 threaded into the internally threaded aperture 76 in the support member. An oil filter 86 is positioned within the discharge end of the conduit fitting.

With this arrangement, during engine operation, the engine oil pump 18 is driven through a suitable drive, not shown, whereby oil is continuously picked up from the sump of the oil pan by the pickup tube 50 and delivered by the oil pump to lubricate the various parts of the engine. A portion of the oil discharged by the oil pump 18 is delivered via secondary oil conduit 78 under pressure to the annular oil groove 68 in the swivel support for the pickup tube 50 to continuously provide oil under pressure therein to lubricate the bearing surface of the passage 46 and the outer peripheral surface of tube 52 to prevent it from sticking within the support member and to simultaneously provide a pressure seal of oil around the tube 52 and the bearing surface of passage 46 to prevent the oil pump from sucking air through this pivot connection into its inlet chamber. By using oil under pressure to lubricate and seal the pivot connection, the pickup tube 50 can be loosely journaled in the support member 28.

What I claim is:

1. An engine oil pump system for use in the oil pan of an internal combustion engine including a driven oil pump having an inlet and a discharge, an inlet conduit means connected at one end to said inlet of said oil pump, an oil pickup tube rotatably connected at one end to the opposite end of said inlet conduit means and having its opposite end free and positioned for swinging movement in said oil pan, and conduit means connected to said discharge of said oil pump and to said inlet conduit means in position to discharge oil from said oil pump to lubricate and seal said oil pickup tube at its rotatable connection with said inlet conduit means.

2. An engine oil pump system according to claim 1 wherein said inlet conduit means includes a support member positioned in said oil pan and having a vertical passage therein with an annular oil groove concentric therewith, and an inlet conduit connecting said vertical passage with said inlet of said oil pump; and wherein said oil pickup tube includes a vertical tube portion rotatively supported in said vertical passage with said annular groove encircling a portion of said vertical tube portion, said conduit means being connected to said support member in position to discharge oil into said annular oil groove to lubricate and seal with oil under pressure the connection of said vertical tube portion in said vertical passage of said support member.

3. An engine oil pump system accordingly to claim 2 wherein said oil pickup tube further includes a substantially horizontal leg portion secured at one end to said vertical tube portion, an oil pickup means having a screen at the inlet thereof secured to the free end of said leg portion and a vane secured to the upper side of said leg portion at an angle thereto.

4. An engine oil pump system for use in the oil pan of an internal combustion engine including a driven oil pump having an inlet and a discharge, a fixed support conduit means having a vertical passage therein mounted within said oil pan, an inlet conduit connecting said fixed support conduit means to the inlet of said oil pump, an oil pickup tube rotatably supported in said vertical passage and having a free end positioned for swinging movement in said oil pan, an annular oil groove in said support member concentric with said vertical passage and encircling a portion of the oil pickup tube rotatably supported in said vertical passage, and conduit means connected to said fixed support conduit means in communication with said annular oil groove therein and connected to said discharge of said oil pump to deliver oil under pressure to the rotatable connection between said oil pickup tube and said vertical passage in said fixed support conduit means.

5. An engine oil pump system according to claim 4 wherein said oil pickup tube further includes a directional vane secured to said free end of said oil pickup tube, said vane being secured at an angle to the centerline of said free end of said oil pickup tube.

6. An engine oil pump system for use in the oil pan of an internal combustion engine including a driven oil pump having an inlet and a discharge, a fixed support conduit means having a vertical passage therein mounted within said oil pan, a retainer bearing plate having an aperture therein secured to said support member with said aperture in alignment with said vertical passage, an inlet conduit connecting said fixed support conduit means to the inlet of said oil pump, an oil pickup tube having a vertical tubular portion and a horizontal portion, a collar encircling said vertical tubular portion and secured thereto, said vertical tubular portion being journaled in said vertical passage and rotatably secured therein by said retainer bearing plate supporting said collar with said horizontal portion of said oil pickup tube being positioned for swinging movement in said oil pan, an annular oil groove in said support member concentric with said vertical passage and encircling said vertical tubular portion and means for conducting oil under pressure connected to said oil pump and to said annular groove to provide a film of oil between said vertical passage and said vertical tubular portion journaled therein.